United States Patent [19]

Hunold et al.

[11] Patent Number: 4,732,620
[45] Date of Patent: Mar. 22, 1988

[54] THERMOELEMENT COMPRISING A GRAPHITE/BORON CARBIDE THERMOCOUPLE

[75] Inventors: Klaus Hunold, Kempten; Alfred Lipp, Bad Worishofen; Klaus Reinmuth, Durach; Peter Arnold, Sulzberg, all of Fed. Rep. of Germany

[73] Assignee: Elektroschmelzwerk Kempten GmbH, Munich, Fed. Rep. of Germany

[21] Appl. No.: 840,989

[22] Filed: Mar. 14, 1986

Related U.S. Application Data

[63] Continuation of Ser. No. 536,883, Sep. 28, 1983, abandoned.

[30] Foreign Application Priority Data

Sep. 28, 1982 [DE] Fed. Rep. of Germany ....... 3235838

[51] Int. Cl.⁴ .............................................. H01L 35/28
[52] U.S. Cl. .................................. 136/228; 136/236.1

[56] References Cited

U.S. PATENT DOCUMENTS

| | | | |
|---|---|---|---|
| 1,897,214 | 2/1933 | Ridgway | 423/291 |
| 2,152,153 | 3/1939 | Ridgway | 136/5 |
| 2,946,835 | 7/1960 | Westbrook et al. | 136/228 |
| 4,195,066 | 3/1980 | Schwetz et al. | 501/87 |
| 4,430,518 | 2/1984 | Nakajima et al. | 136/234 |
| 4,450,314 | 5/1984 | Huther | 136/201 |

*Primary Examiner*—Donald P. Walsh
*Assistant Examiner*—T. J. Wallen
*Attorney, Agent, or Firm*—Burgess, Ryan & Wayne

[57] ABSTRACT

The invention is an improved theroelement which comprises a graphite/boron carbide thermocouple, the arms of which are constructed as a tube and a rod, arranged concentrically inside the tube, which are electrically connected at one end. One of the arms of the thermocouple consists essentially of boron carbide formed from self bonding boron carbide by pressureless sintering. Prefabricated sleeves of high-purity, boron-oxide-free hexagonal boron nitride are used between the arms of the thermocouple as spacers. Only the end of the arm of the thermocouple constructed as a rod is secured in an electrically conductive connecting piece and the arm is freely mobile in the direction towards the cold junction. As the material for the arm of the thermocouple constructed as a rod, there can be used, for example, boron carbide having a coarse-grained structure and a density of from 60 to 80% TD, which has been manufactured from boron carbide powder having bimodal particle size distribution by means of extrusion, followed by pressureless sintering at from 2000° to 2250° C.

The thermoelement can also be manufactured in one operation by means of pressureless sintering of the boron carbide powder in situ. Such a thermoelement comprises, for example, a flexible graphite cord for the arm of the thermocouple constructed as a rod, a boron-nitride envelope and a boron-carbide casing, the envelope and casing having been formed from powders sintered in situ without pressure.

11 Claims, 7 Drawing Figures

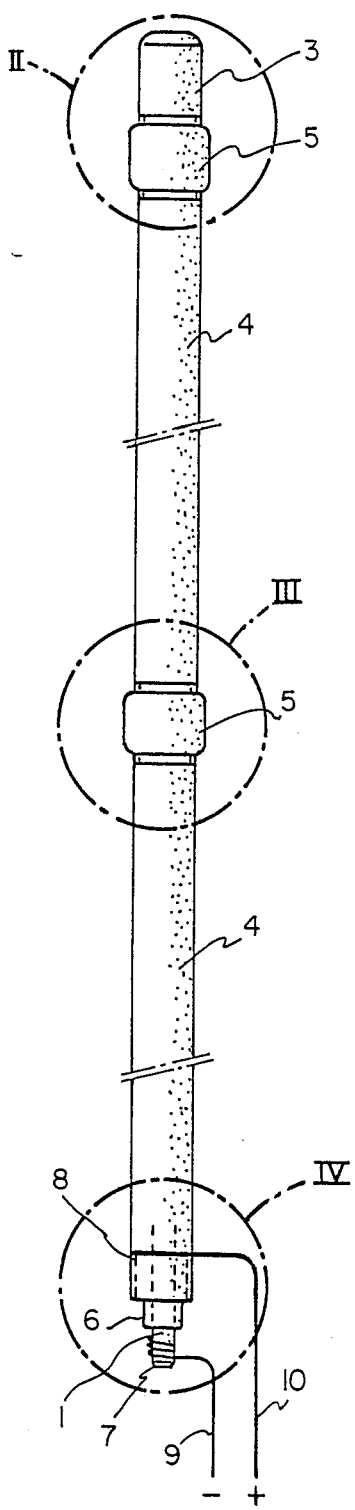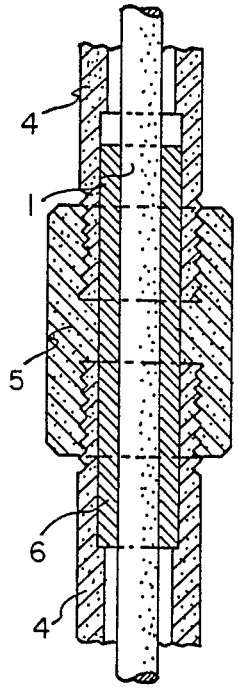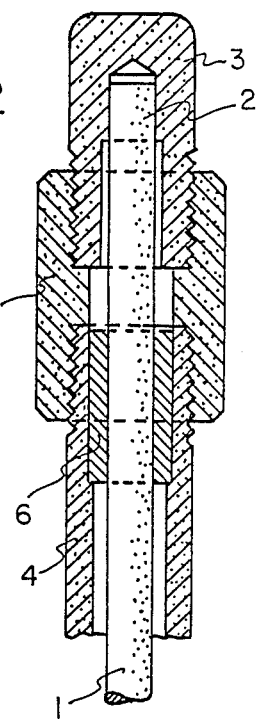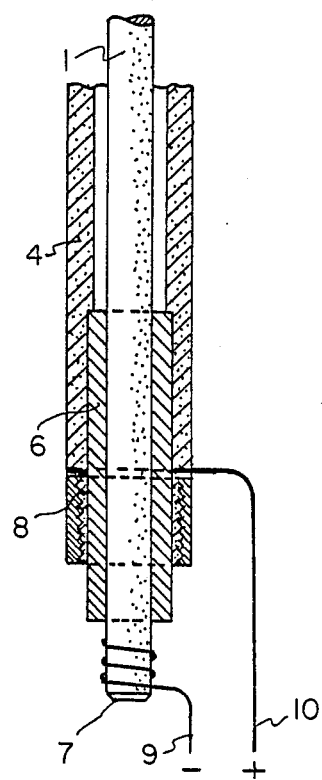

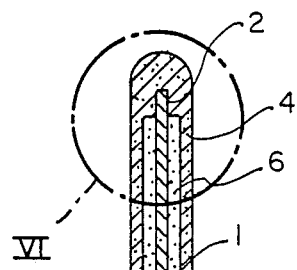
FIG. 5
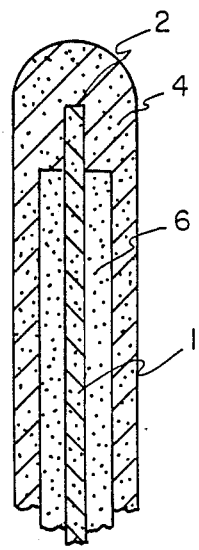
FIG. 6
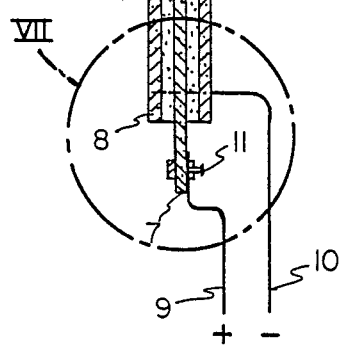
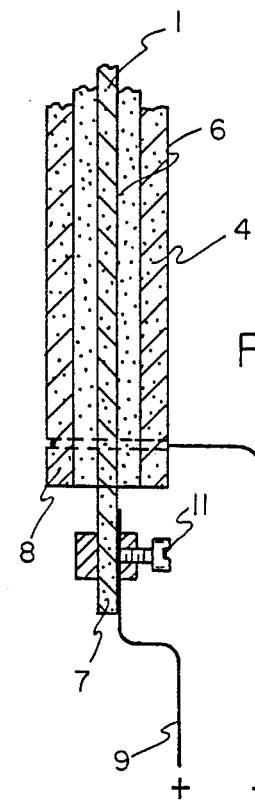
FIG. 7

THERMOELEMENT COMPRISING A GRAPHITE/BORON CARBIDE THERMOCOUPLE

This is a continuation of application Ser. No. 536,883, filed 9/28/83, now abandoned.

In industry, high temperatures are generally measured using thermoelements comprising metal thermocouples, the arms of which are customarily in the form of wires which are electrically connected at one end. Metal couples such as tungsten/rehenium and iridium/rehenium alloys, can be used to measure temperatures up to about 2400° C. (cf. "*Ullmanns Enzyklopadie der technischen Chemie*", 4th edition, volume 5, page 814 (1980)).

These thermoelements comprising metal thermocouples can be used for high-temperature measurements in inert gases, in vacuo and in reducing atmospheres. In order to protect them from damage and/or the action of corrosive media, however, they must be provided with a protective tube and thermocouple wires have to be electrically insulated from one another and from the protective tube. Only electrical insulating materials which have a sufficiently high electrical resistance at high temperatures such as thorium oxide, magnesium oxide, aluminium oxide, beryllium oxide and boron nitride are suitable. Furthermore, temperatures in the range of from 1800° to 2000° C. are limiting temperatures for all thermocouples made of metal. Their temperature indication is stable only up to this range, since, at higher temperatures physical changes occur as a result of recrystallization and brittleness, resulting in changes in the thermal voltage and hence instability in the temperature indication.

BACKGROUND OF THE INVENTION

Because of the known disadvantages of metal thermocouples, which are apparent when measuring high temperatures, thermocouples made of non-metallic materials have been developed. Thermocouples made of non-metallic materials are generally simple to fabricate because electrical insulation of the arms of the thermocouple using ceramic materials is not absolutely essential and often no protective tube is required. They are, however, in general, inferior to thermocouples made of metals in regard to mechanical and thermoelectric properties. Thermocouples having a graphite arm have been described as suitable for measuring temperatures in the range of from 2000° C. to 2500° C. Thermocouples made of C/C, in which the two arms consists of graphite having different electrical properties and those of $C/TiC$, $C/NbC$ and $C/ZrB_2$, as well as those of $C/B_4C$, have been known for a long time but have not hitherto been used in industry (cf. "*Nichtmetallene Thermopaare und Schutzrohre*", parts 1 and 2, G. W. Samsonow and P. S. Kislyj, published in *VDI* (*Ver. Deut. Inq.*) Z 1969, 111 (19), pages 1337–42; (24) pages 1706–12; ref. in C.A. vol. 73 (1970), No. 101673j).

It has been found, however, that a commercially available thermoelement comprising a thermocouple using pure graphite/boron-treated graphite with a boron content of approximately 1% by weight which has a thermal voltage of 100 mV at 2000° C., shows a marked change in the thermal voltage probably attributable to diffusion of the boron at the hot junction point, when used for extended periods in a high-temperature range. This thermoelement is thus subject to the same instability in temperature indication, in the high-temperature range as are the known thermoelements comprising metal thermocouples.

On the other hand, a thermoelement comprising a graphite/boron carbide thermocouple, as described in U.S. Pat. No. 2,152,153, which has a thermal voltage of 600 mV at 2000° C. would not be expected to show a change in the thermal voltage as a result of material exchange at the hot junction point because boron carbide does not react with graphite at high temperatures. Although it has been known for more than 40 years that a $C/B_4C$ thermocouple would be well suited for use as a thermoelement for measuring high temperatures because of its high thermal voltage and its stability at high temperatures, its complex construction and the associated disadvantages have hitherto prevented its use in industry.

Accordingly to the above-mentioned U.S. Patent the arms of the thermocouple are constructed as a tube and rod arranged concentrically inside the tube and are electrically connected at one end, the tube advantageously comprising graphite and the rod boron carbide. Rods of pure boron carbide having adequate mechanical strength can be manufactured by hot pressing by the process described in U.S. Pat. No. 1,897,214. The shaping and size possibilities in the case of hot pressing are, however, limited, so that only relatively short rods can be made by this method. Complex cooling equipment is therefore provided in the construction of the thermoelement according to U.S. Pat. No. 2,152,153, both for graphite tube and for the boron carbide rod, in order to obtain an adequate temperature difference between the hot junction point (hot junction) and the cold junction, which is still in the hot area. A greater distance between the hot and cold junctions cannot be achieved by means of so-called "interconnectors", which are customarily used for thermoelements comprising metal thermocouples, since no material is known which produces the same thermal voltage in the temperature range of from 0° C. to 200° C. as does the $C/B_4C$ thermocouple itself. Because of the cold junction being in the hot area, however, the measuring accuracy of the thermoelement is not adequately guaranteed. In addition, because of its limited length, it cannot be used for large furnaces where the temperature has to be measured inside the furnace chamber.

BRIEF SUMMARY OF THE INVENTION

There is a need for an improved thermoelement comprising a graphite/boron carbide thermocouple, the arms of which are constructed as a tube and a rod arranged concentrically inside the tube, which are electrically connected at one end, in which the hot and cold junctions are arranged sufficiently for apart that the cold junction is not in the hot area and complex cooling equipment is not required.

According to the invention an improved graphite/boron carbide thermocouple is provided using self bonded polycrystalline boron carbide which has been formed by pressureless sintering, as the material for one of the arms of the thermocouple.

BRIEF DESCRIPTION OF THE DRAWINGS

FIG. 1 is a diagramatic view of a thermoelement of the present invention.

FIG. 2 is an enlarged longitudinal section of the portion II of FIG. 1.

FIG. 3 is an enlarged longitudinal section of the portion III of FIG. 1.

FIG. 4 is an enlarged longitudinal section of the portion IV of FIG. 1.

FIG. 5 is a longitudinal section of a continously formed thermoelement of the present invention.

FIG. 6 is an enlarged longitudinal section of the portion VI of FIG. 5.

FIG. 7 is an enlarged longitudinal section of the portion VII of FIG. 5.

DETAILED DESCRIPTION OF THE INVENTION

Figure 8:
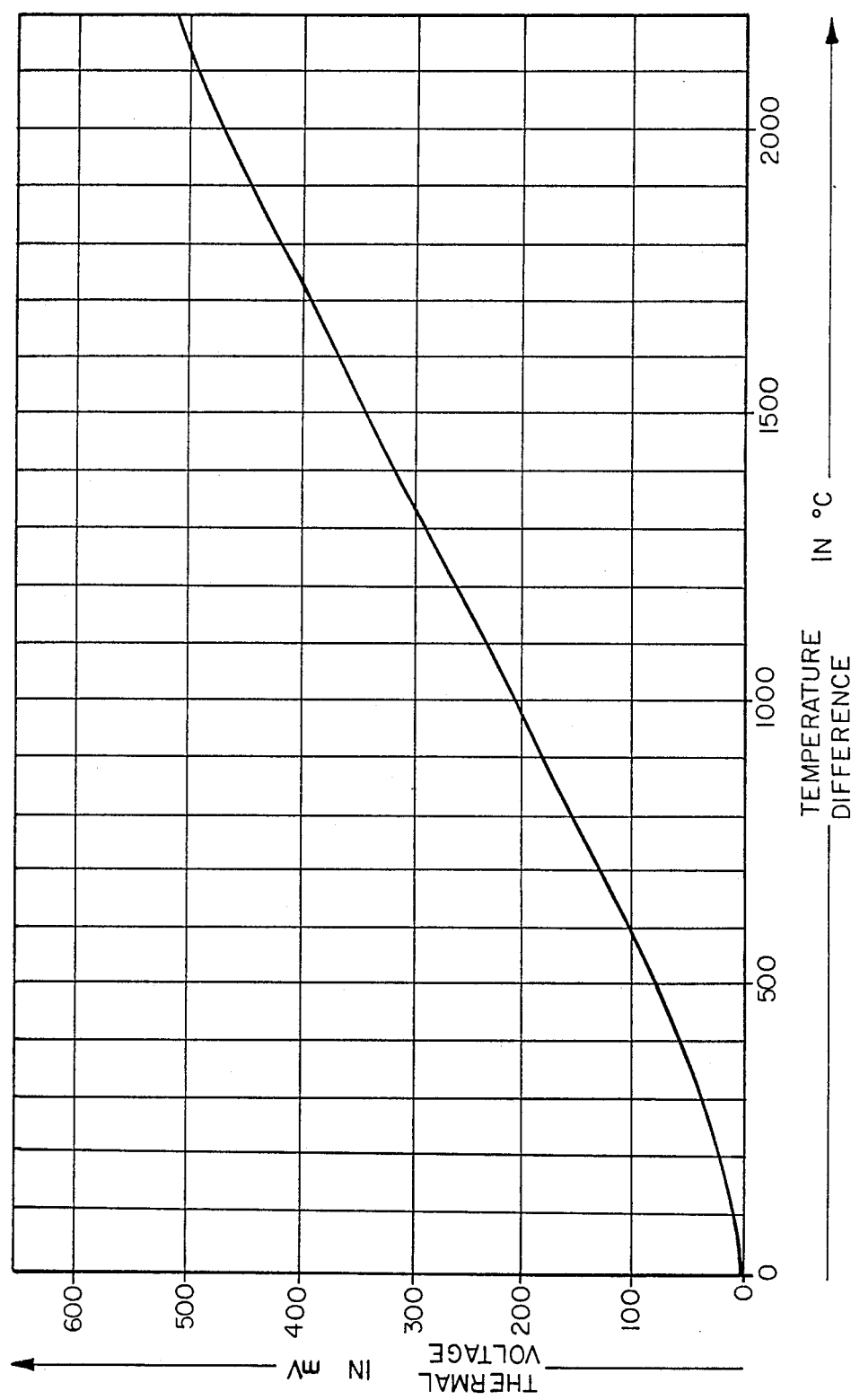

In pressureless sintering processes, the shaping possibilities are not limited as in the case of hot pressing, and thus they can be used to manufacture boron carbide rods and also tubes of any desired length. The construction of the thermoelement is appreciably simplified since the length of one of the arms of the thermocouple is no longer limited. The use of rods and tubes of any desired length permits the hot and cold junctions to be arranged sufficiently far apart so that the cold junction can be reliably within the cold area. Location of the cold junction in a cold area improves the measuring accuracy and obviates the need for complex cooling equipment. Furthermore, the length of the whole thermoelement can be adapted for any desired intended use. These thermoelements can be used for example, for measuring temperatures inside large furnaces.

The only pressureless sintering processes which can be used are of course those which permit the manufacture of rods or tubes of polycrystalline self-bonded boron carbide. Self bonded boron carbide as used herein refers to a composition consisting essentially of boron and carbon. Apart from the boron and carbon atoms present in the pulverulent starting materials, no foreign elements, compounds or sintering aids which become a part of the sintered compacts are introduced.

The boron carbide tubes or rods required for the thermoelements of the present invention can be manufactured, for example, by the process decribed in U.S. Pat. No. 4,195,066, from boron carbide powder of sub-micron fineness and a carbon-containing additive by means of pressureless sintering. The tubes or rods thus obtained which comprise pure $B_4C$ of stoichiometric composition or graphit-containing $B_4C$ with up to 0.8% by weight of excess carbon, have a density of at least 90% of the theoretical density of pure $B_4C$ (abbreviated below to % TD) and a flexural strength of more than 300 $N/mm^2$, which serves as a measure of its mechanical strength.

It is, however, not absolutely essential for the rods or tubes of boron carbide to have such a high density and mechanical strength. It is important, on the other hand, that it should be possible for them to be manufactured in any length and be virtually free of texture and cavities. It is desirable that they should have as uniform a grain structure as possible and be essentially stress-free.

The process described in DE-PS P No. 31 49 796.9, filed on 12/16/1981, has proved especially suitable for this purpose. In this process, boron carbide powders having bimodal grain distribution and comprising a coarse-grained portion and fine-grained portion are compacted without the use of sintering aids to form green bodies and are then sintered without pressure at a temperature of at least 1900° C. in a protective gas atmosphere. The tubes or rods thus obtained, which comprise $B_4C$ having a relatively coarse-grain structure are porous and have uniform grain and pore distribution. The density of the rods or tubes produced by the process is determined by the density of the green body, as virtually no, or only very little, shrinkage occurs during the sintering process. The rods or tubes have a flexural strength of approximately 100 to 200 $N/mm^2$.

Prefabricated components can be used to construct the thermoelement. Because stress-free rods of boron carbide produced by pressureless sintering are easier to manufacture than are tubes and because boron carbide is more difficult to machine because of its hardness, it is advantageous, for reasons of economy, to use graphite tubes and boron carbide rods which are electrically connected at one end by a component made of graphite.

Commercially available electrographite products can be used as materials for the tubes and components. If their length is not adequate, several graphite tubes can be joined together using a connecting component of graphite.

Boron carbide having a coarse-grain structure is advantageously used as the material for the rods. Such rods can, for example, be manufactured, as follows, by a process very similar to that described in the above-mentioned DE-PS P No. 31 49 769.9.

Boron carbide powders having a bimodal particle size distribution are mixed with about 1 to 2% by weight of a temporary binder based on a water-soluble cellulose ether such as methyl cellulose and water, to form a homogeneous composition of paste-like consistency. The paste-like composition is shaped continuously by extrusion to form rods which are taken up on graphite substrates. After drying, the rods are sintered continuously at from 2000° to 2250° C. by being passed continuously through a fixed heating zone of a pusher-type sintering furnace which is flushed with a protective gas. The length of the rods produced in this manner is limited only by available handling facilities and can be up to several metres in length, depending on the thickness. The rods have a coarse-grain structure, as the fine-grain portion has disappeared after sintering, and a density of approximately 60 to 80% TD.

Prefabricated sleeves made of hexagonal boron nitride are advantageously used as spacers.

Instead of being constructed from pre-fabricated components, the whole thermoelement comprising the rod, spacer and tube, can also be manufactured in one operation by pressureless sintering of the boron carbide powder in situ. If high-purity, boron oxide-free hexagonal boron nitride powder is used as the starting material for the spacer, it can be sintered without pressure, together with the boron carbide powder, in situ. Such a thermoelement preferably comprises a flexible graphite element which can be in the form of a cord or rope for the arm of the thermocouple, which is constructed as a rod, an envelope of boron nitride covering the flexible graphite element and a casing of boron carbide having a coarse-grain structure and a density of from 60 to 80% of the theorethical density of pure boron carbide. The boron carbide casing is electrically connected at one end to the graphite element, the graphite element, envelope and casing having been sintered together in situ, without pressure.

The following process has proved expecially suitable for the manufacture of the thermoelements of the invention.

To a commercially available flexible graphite cord having a thickness in the range of 1 to 2 mm there is applied concentrically, by means of extrusion, a layer of boron nitride and a layer of boron carbide having a bimodal particle size distribution. An extruder which is divided into two chambers located concentrically around an inner pipe is used for the application. The graphite cord is moved continuously through the inner pipe and the two concentric layers are pressed on at the same time. When the element reaches the desired length, the element is cut, and one end of the graphite cord is exposed and brought directly into contact with the boron carbide composition, for example, by applying the boron carbide composition by hand. The boron nitride composition is mixed with water and the boron carbide composition is mixed with a temporary binder and water to form an extrudable composition which holds its shape during the extruding, drying and pressureless sintering operation. The element is taken up on a graphite substrate and dried, and then heated under protective conditions at from 2000° to 2250° C., the layers which have been applied, forming, by means of sintering, the boron nitride envelope and the boron carbide casing.

A first embodiment for the construction of a thermoelement made of prefabricated components according to the invention is shown in FIGS. 1 to 4.

In FIGS. 1-4, 1 denotes a boron carbide rod of any desired length, the end 2 of which is secured by being fitted in an electrically conductive connecting piece 3 of graphite, and 4 denotes graphite tubes which are screw-connected to one another and to 3 by means of graphite sleeves 5. Between the graphite tubes 4 and the boron carbide rod 1 are located spacers 6 of an electrically insulating material. The spacers are preferably constructed as sleeves which cover the boron carbide rod 1 either over its whole length or only at specific intervals, and which are anchored in each case in the graphite tubes 4. The end 7 of the boron carbide rod 1 and the end 8 of the graphite tube 4 are each connected to copper wires 9 and 10, from which the voltage can be measured by a voltmeter or other monitoring means.

The spacers 6 are preferably prefabricated sleeves made of high-purity, boron-oxide-free, hexagonal boron nitride which, because of its good antifriction properties, offers virtually no sliding resistance to the boron carbide rod 1 when the latter is displaced with respect to the graphite tube 4 as a result of the differing thermal expansions in the longitudinal direction. The boron carbide rod 1 is firmly clamped only at its end 2 and can therefore move freely in the direction of the cold junction. In order to ensure free movement of the boron carbide rod 1, only the graphite tube 4 is secured by means of a retaining device, for example, at the point of its entering the furnace or at the end 8 of the tube when the thermoelement is used in a furnace.

A most suitable embodiment of the construction of a thermoelement according to the invention, which has been manufactured in one operation by means of pressureless sintering of boron carbide powder in situ, is shown in FIGS. 5 to 7.

In FIGS. 5-7, 1 denotes a flexible graphite cord of any desired length, one end 2 of which is electrically connected to an outer boron carbide casing 4 (FIG. 6) Between the graphited cord 1 and the outer boron carbide casing 4 is a continous insulating envelope of boron nitride 6. The end 7 of the graphited cord 1 and the end 8 of the boron carbide casing 4 are in each case connected to copper wires 9 and 10, from which the voltage can be measured by a voltmeter (not shown).

The copper wire 9 is preferrably fixed to the end 7 of the graphite cord 1 by means of a clamping screw 11.

The thermoelements according to the invention can be used without additional protective elements for measuring temperatures of up to 2400° C. in furnaces having a non-oxidising atmosphere, the size of the furnace being of no significance.

In furnaces which operate at relatively low positive pressure or under reduced pressure in a reducing or inert-gas atmosphere, the thermoelement of the present invention can be introduced to any desired distance directly through the wall of the furnace, without the use of protective tubes so that the temperature can be measured at any desired place inside the furnace chamber. The distance between the point of entering the furnace and the cold junction outside the furnace can be selected to be of such a length that the latter is virtually at room temperature. It is optionally alternatively possible for the cold junction to be thermostatted by attaching cooling pipes to the graphite tube according to the first embodiment, if, for example in order to save space, a smaller distance is used.

When the thermoelement is removed from the furnace, it is advantageous to fill the inside of the thermoelement according to the first embodiment (FIG. 1) with a protective gas as, for example, argon, in order to prevent ambient air from penetrating the space between the graphite tube and the boron carbide rod. This can be effected by attaching a gas-impermeable housing to the part of the graphite tube which has been removed from the furnace, in which housing openings for the copper wires and any cooling pipes present are provided. By means of closeable gas-inlet and gas-outlet openings, a protective-gas filling can be renewed after relatively long use if this is necessary because of the leak rate of the graphite tube.

This precaution is not absolutely essential for a thermoelement according to the second embodiment, as the continuous, relatively dense boron nitride, intermediate layer 6 represents an adequate barrier which prevents the penetration of ambient air.

In furnaces which operate under a high vacuum, the leak rate through the graphite tube is too high. In this case, it is therefore advantages to equip the thermoelement with a gas-impermeable protective tube of refractory metal such as, for example, tungsten or molybdenum.

In furnaces which operate under a high pressure such as high-pressure autoclaves which are used for isostatic hot pressing in which an inert gas is used as the pressure-transmission medium the thermoelement of the present invention cannot be introduced through the autoclave wall and used to seal off the furnace, and contain the pressure which is present. In this case it is preferable for the cold junction to be inside the autoclave and be brought as close as possible to the autoclave wall. The hot junction can be any distance inside the autoclave, as far as into the actual heating chamber, which is insulated thermally from the autoclave wall. The cold junction temperature can be measured with the aid of a second thermoelement which can be a metal thermocouple, for example, NiCr/Ni, of which the arms, constructed in the form of wires, are brought out of the furnace through suitable wire ducts in the autoclave wall and are brought to ambient temperature outside of the autoclave. The absolute thermal voltage, based on a fixed cold junction temperature of, for example, 0° C. or 20° C., is transferred directly to a measuring instrument by means of a suitable compensating circuit.

The subject of the invention is illustrated in detail in the following Examples:

EXAMPLE 1

(a) Manufacture of a rod of self-bonded polycrystalline boron carbide

Commercially available $B_4C$ powders (F 360 in the form of coarse particles of 12 μm to 40 μm and F 1500 in the form of fine particles of 3 μm and finer) were used as the starting powders.

69% by weight of the coarse grain (F 360) was mixed in a kneading apparatus with 30% by weight of the fine grain (F1500), with the addition of 1% by weight of a highly viscous methylcellulose (Tylose MH 4000) and water, until a homogeneous composition of paste-like consistency was formed. The composition was introduced into a hydraulic extruder and, by means of an extrusion die having a diameter of 3.5 mm, shaped into rods approximately 1 m in length which were taken up on graphite substrates and dried in air. The rods were then sintered on the graphite substate at 2200° C. while being flushed with argon in a pusher-type furnace. The rods made of self-bonded polycrystalline boron carbide manufactured in this manner were easy to handle and had a density of 1.93 g/cm³, corresponding to 77% TD of boron carbide.

(b) Construction of the thermoelement

The 1000 mm long $B_4C$ rod 1 having a diameter of 3.3 mm, manufactured in accordance with (a) and clamped solidly in a graphite connecting piece 3, was used for the construction of a 1 m long thermoelement, in accordance with FIGS. 1 to 4.

Two tubes of commercially available electrographite (EK 76 from Messrs. Ringsdorff-Werke GmbH), each of which was 500 mm in length with an internal diameter of 6 mm and an external diameter of 10 mm, were screwed together and joined to tip piece 3 by means of graphite sleeves 5.

As the spacers 6, three prefabricated sleeves of high-purity boron nitride (SBN from Messrs. ESK), each of which was 50 mm in length and had an internal diameter of 3.3 mm and an external diameter of 7.2 mm, were inserted into notches in the graphite tubes. The cold junction of the thermoelement was thermostatted by means of a cooling pipe arranged on the graphite tube and was sealed by means of a gas-impermeable housing. The thermoelement was filled with argon.

The thermal voltage of this thermoelement was measured in a resistance-heated graphite furnace against a constant cold junction temperature of 20° C., a calibrated W5Re/W26Re thermoelement being used for the comparison. The resulting thermal voltage curve is shown in FIG. 8 in the form of a graph.

The curve could only be recoded up to 2200° C. because of drifting and subsequent fracture of the W5Re/W26Re thermoelement used for comparison. It was possible, using the same $B_4C$/C thermoelement, to repeat the measurement 10 times. After the 10 repeat measurements, the thermoelement was still usable.

EXAMPLE 2

Manufacture and construction of a polycrystalline boron carbide thermoelement in one operation The same commercially available $B_4C$ powders (F 360 and F 1500) were used as starting powders in this example as were used in the manufacture of the boron carbide rod according to Example 1 (a).

A high-purity, boron-oxide-free, hexagonal BN powder having a specific surface area of approximately 6 m²/g (measured according to the BET method) was used as the boron nitride powder.

68% by weight of the coarse-grain $B_4C$ (F 36) was mixed in a kneading apparatus with 30% by weight of the fine-grain $B_4C$ (F 1500), with the addition of 2% by weight of highly viscous methylcellulose (Tylose MH 4000) and water, until a homogeneous composition of paste-like consistency had formed.

The BN powder was also processed, with the addition of water alone, to give a homogeneous composition of paste-like consistency.

A commercially available, flexible, 2 mm thick, graphited cord (type Sigrafil D 2 from Messrs. Sigri/Meitingen) was used as the graphite rod.

The graphite cord was placed in one chamber of a hydraulic extruder and taken through a pipe to the centre of a first round extrusion die. A second chamber for the BN composition was arranged concentrically around the pipe and the first inner chamber and connected to a second extrusion die arranged concentrically around the first extrusion die. A third chamber for the $B_4C$ composition was connected to an extrusion die arranged concentrically around the first and second extrusion dies. The free external capacity of the extruder chambers was filled with the BN and $B_4C$ compositions. The BN and the $B_4C$ compositions were each forced out of the round extrusion die of the extruder simultaneously by means of hydraulic plungers. An approximately 2 mm thick BN layer, was laid concentrically around the graphite cord which was pulled partially out of the extrusion die. By means of the mechanical connection of the BN layer to the graphite cord, the latter was carried along at the speed at which the composition was forced out of the die. The extruded element was taken up on a graphite substrate and cut to a length of approximately 1 m. Approximately 5 mm of the graphite cord on one end of the element were exposed and the $B_4C$ composition was moulded around it, so that contact was established between the graphite cord and the $B_4C$ outer layer. The extruded element was then dried on the graphite substrates and sintered at 2250° C. in a pusher-type furnace which was flushed with argon. The finished thermoelement has substantially the same thermal voltage curve as shown in FIG. 8.

The sintering temperature, which was higher than in Example 1 (a), caused a slight shrinkage of the $B_4C$ layer, amounting to from 3 to 4%. The slightly higher content of free carbon which resulted from decomposition of the finely dispersed Tylose which was used also contributed to the shrinkage. The shrinkage, in the direction of the graphite cord, resulted in good contact at the junction point of the cord and the $B_4C$ layer. The boron nitride layer and the graphite cord exhibited no shrinkage apart from the slight compression caused by the shrinkage of the outer $B_4C$ layer.

We claim:

1. In a thermoelement comprising a graphite/boron carbide thermocouple, including two arms constructed as a tube and a rod, said rod arranged concentrically inside the tube, and electrically connected at one end, the improvement which comprises, one arm of said thermocouple being self bonded, pressureless sintered boron carbide having a density of from 60 to 80% of the theoretical density of pure boron carbide.

2. A thermoelement of claim 1 wherein a boron-oxide-free hexagonal boron nitride element is positioned between the arms of the thermocouple.

3. A thermoelement of claim 1 wherein only said rod is freely mobile in a direction towards the cold junction.

4. A thermoelement of claim 1, wherein the rod consists essentially of boron carbide having a density of from 60 to 80% of the theoretical density of pure boron carbide, obtained by extruding and pressureless sintering at from 2000° to 2250° C., of a boron carbide powder having a bimodal particle size distribution.

5. A thermoelement of claim 1, wherein the rod, a spacer element and the tube are formed in one operation, and wherein the tube is formed by pressureless sintering of boron carbide powder in situ.

6. A thermoelement of claim 5, wherein the spacer element is formed by pressureless sintering high-purity, boron-oxide-free, hexagonal boron nitride powder, together with the boron carbide powder, in situ.

7. A thermoelement comprising a graphite/boron carbide thermocouple and comprised of a rod of flexible graphite cord, a boron nitride envelope, as a spacer element, and a tube of boron carbide having a density of from 60 to 80% of the theoretical density of pure boron carbide, one end of which is electrically connected to the graphite cord, the envelope and the casing having been formed by pressureless sintering together in situ an element comprising a graphite cord having placed thereon a concentric layer of particulate boron-oxide-free hexagonal boron nitride and a concentric layer of particulate boron carbide.

8. A process for the manufacture of a thermoelement comprising a graphite/boron carbide thermocouple and comprised of a rod of flexible graphite cord, a boron nitride envelope, as a spacer element, concentrically around said graphite cord and a casing of boron carbide concentrically around said spacer element having a density of from 60 to 80% of the theoretical density of pure boron carbide forming the tube one end of which is electrically connected to the graphite cord, the envelope and the casing having been formed by pressureless sintering together in situ an element comprising a graphite cord having placed thereon a concentric layer of particulate boron-oxide-free hexaganol boron nitride and a concentric layer of particulate boron carbide, which process comprises forming an arrangement by extruding a layer of boron nitride powder, followed by a layer of boron carbide powder, having a bimodal particle size distribution, concentrically to the flexible graphite cord and connecting one end of the graphite cord directly to the boron carbide powder; and pressureless sintering of the arrangement at a temperature in the range of 2000° to 2250° C. until the boron nitride envelope and the boron carbide casing are formed.

9. The process of claim 8, wherein said layer of boron nitride powder and said layer of boron carbide powder are extruded simultaneously and laid concentrically around said flexible graphite cord.

10. The process of claim 8, wherein said flexible graphite cord is moved at the same speed at which said layer of boron nitride powder and said layer of boron carbide powder are extruded.

11. The process of claim 8, wherein said thermoelement formed is at least one meter in length.

* * * * *